US010462403B2

(12) United States Patent
Nakano et al.

(10) Patent No.: US 10,462,403 B2
(45) Date of Patent: *Oct. 29, 2019

(54) ELECTRIC CAMERA

(71) Applicant: Maxell, Ltd., Kyoto (JP)

(72) Inventors: Takahiro Nakano, Tokyo (JP); Ryuji Nishimura, Tokyo (JP); Toshiro Kinugasa, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,774

(22) Filed: Apr. 23, 2018

(65) Prior Publication Data

US 2018/0241958 A1    Aug. 23, 2018

Related U.S. Application Data

(60) Continuation of application No. 15/386,656, filed on Dec. 21, 2016, which is a continuation of application
(Continued)

(30) Foreign Application Priority Data

Jan. 11, 2000   (JP) ............................... 2000-006064

(51) Int. Cl.
*H04N 5/372* (2011.01)
*H04N 9/04* (2006.01)
(Continued)

(52) U.S. Cl.
CPC ......... *H04N 5/372* (2013.01); *H04N 5/23248* (2013.01); *H04N 5/23258* (2013.01);
(Continued)

(58) Field of Classification Search
CPC .. H04N 5/372; H04N 9/045; H04N 2209/045; H04N 5/23248; H04N 5/23258; H04N 5/23274; H04N 5/3741
See application file for complete search history.

(56) References Cited

U.S. PATENT DOCUMENTS 3,486,128 A   12/1969   Lohrmann
4,054,915 A   10/1977   Sugihara
(Continued)

FOREIGN PATENT DOCUMENTS

EP   0 587 954 A1   3/1994
EP   0 802 688 A1   10/1997
(Continued)

OTHER PUBLICATIONS

ZTE (USA) Inc.'s Provisional Preliminary Invalidity Contentions which were filed in the following litigation: *Hitachi Maxell, Ltd.* v. *ZTE Corp. and ZTE USA Inc.*, Civil Action No. 5:16-cv-00179 RWS (E.D. Tex.), filed Apr. 17, 2017.
(Continued)

*Primary Examiner* — Luong T Nguyen
(74) *Attorney, Agent, or Firm* — Mattingly & Malur, PC

(57) ABSTRACT

An electric camera includes an image sensing device with a light receiving surface having N vertically arranged pixels and an arbitrary number of pixels arranged horizontally, N being equal to or more than three times the number of effective scanning lines M of a display screen of a television system, a driver to drive the image sensing device to vertically mix or cull signal charges accumulated in individual pixels of K pixels to produce, during a vertical effective scanning period of the television system, a number of lines of output signals which corresponds to 1/K the number of vertically arranged pixels N of the image sensing device, K being an integer equal to or less than an integral part of a quotient of N divided by M, and a signal processing unit having a function of generating image signals by using the output signals of the image sensing device.

20 Claims, 8 Drawing Sheets

Related U.S. Application Data

No. 14/661,227, filed on Mar. 18, 2015, now Pat. No. 9,544,517, which is a continuation of application No. 14/264,243, filed on Apr. 29, 2014, now Pat. No. 9,100,604, which is a continuation of application No. 13/681,495, filed on Nov. 20, 2012, now Pat. No. 8,736,729, which is a continuation of application No. 12/845,266, filed on Jul. 28, 2010, now Pat. No. 8,339,493, which is a continuation of application No. 10/660,710, filed on Sep. 12, 2003, now Pat. No. 8,059,177, which is a division of application No. 09/520,836, filed on Mar. 8, 2000, now Pat. No. 6,765,616.

(51) Int. Cl.
*H04N 5/232* (2006.01)
*H04N 5/374* (2011.01)

(52) U.S. Cl.
CPC ....... *H04N 5/23274* (2013.01); *H04N 5/3741* (2013.01); *H04N 9/045* (2013.01); *H04N 2209/045* (2013.01)

(56) References Cited

U.S. PATENT DOCUMENTS

| | | |
|---|---|---|
| 4,541,010 A | 9/1985 | Alston |
| 4,591,900 A | 5/1986 | Heeb |
| 4,612,575 A | 9/1986 | Ishman et al. |
| 4,691,253 A | 9/1987 | Silver |
| 4,740,828 A | 4/1988 | Kinoshita |
| 4,750,041 A * | 6/1988 | Vogel .................. H04N 3/155 |
| | | 348/220.1 |
| 4,766,580 A | 8/1988 | Go |
| 4,788,672 A | 11/1988 | Toyooka |
| 4,811,421 A | 3/1989 | Havel |
| 4,827,462 A | 5/1989 | Flannagan |
| 4,855,724 A | 8/1989 | Yang |
| 4,901,307 A | 2/1990 | Gilhousen |
| 4,907,183 A | 3/1990 | Tanaka |
| 4,958,915 A | 9/1990 | Okada et al. |
| 4,963,981 A | 10/1990 | Todaka |
| 4,991,004 A | 2/1991 | Hayashi |
| 4,992,753 A | 2/1991 | Jenson |
| 5,054,052 A | 10/1991 | Nonami |
| 5,056,109 A | 10/1991 | Gilhousen |
| 5,060,074 A | 10/1991 | Kinugasa et al. |
| 5,083,266 A | 1/1992 | Watanabe |
| 5,101,173 A | 3/1992 | Dipiazza |
| 5,124,963 A | 6/1992 | Ando |
| 5,128,629 A | 7/1992 | Trinh |
| 5,148,418 A | 9/1992 | Tsurushima |
| 5,170,249 A | 12/1992 | Ohtsubo et al. |
| 5,173,709 A | 12/1992 | Lauro |
| 5,177,720 A | 1/1993 | Kondo |
| 5,187,569 A | 2/1993 | Tani |
| 5,193,223 A | 3/1993 | Walczak |
| 5,222,104 A | 6/1993 | Medendorp |
| 5,230,056 A | 7/1993 | Hoshina |
| 5,245,297 A | 9/1993 | Claydon |
| 5,267,262 A | 11/1993 | Wheatley |
| 5,283,651 A | 2/1994 | Ishizuka |
| 5,287,192 A | 2/1994 | Iizuka |
| 5,287,555 A | 2/1994 | Lemersal |
| 5,319,449 A | 6/1994 | Saito |
| 5,321,849 A | 6/1994 | Lemson |
| 5,337,006 A | 8/1994 | Miyazaki |
| 5,383,223 A | 1/1995 | Inokuchi |
| 5,390,338 A | 2/1995 | Bodin |
| 5,402,173 A | 3/1995 | Noguchi et al. |
| 5,402,182 A | 3/1995 | Sugiura |
| 5,420,632 A | 5/1995 | Yamagiwa |
| 5,423,081 A | 6/1995 | Thiele |
| 5,434,625 A | 7/1995 | Willis |
| 5,438,365 A | 8/1995 | Yamashita et al. |
| 5,440,343 A | 8/1995 | Parulski et al. |
| 5,444,482 A | 8/1995 | Misawa |
| 5,448,292 A | 9/1995 | Matsui |
| 5,452,473 A | 9/1995 | Weiland |
| 5,470,233 A | 11/1995 | Fruchterman |
| 5,485,486 A | 1/1996 | Gilhousen |
| 5,493,335 A | 2/1996 | Parulski et al. |
| 5,497,191 A | 3/1996 | Yoo et al. |
| 5,497,192 A | 3/1996 | Ishizuka |
| 5,502,483 A | 3/1996 | Takase et al. |
| 5,502,484 A * | 3/1996 | Okada ................ H04N 5/23248 |
| | | 348/208.6 |
| 5,517,239 A | 5/1996 | Nakayama |
| 5,521,636 A | 5/1996 | Nakayama |
| 5,543,789 A | 8/1996 | Behr |
| 5,548,616 A | 8/1996 | Micke |
| 5,552,989 A | 9/1996 | Bertrand |
| 5,559,471 A | 9/1996 | Black |
| 5,559,778 A | 9/1996 | Inokuchi |
| 5,568,187 A | 10/1996 | Okino |
| 5,574,747 A | 11/1996 | Lomp |
| 5,592,382 A | 1/1997 | Colley |
| 5,592,575 A * | 1/1997 | Nakazato .................. G06T 1/00 |
| | | 348/231.6 |
| 5,603,106 A | 2/1997 | Toda |
| 5,604,730 A | 2/1997 | Tiedemann, Jr. |
| 5,608,707 A | 3/1997 | Ogawa |
| 5,617,060 A | 4/1997 | Wilson |
| 5,627,857 A | 5/1997 | Wilson |
| 5,638,132 A | 6/1997 | Hokari et al. |
| 5,642,378 A | 6/1997 | Denheyer |
| 5,666,160 A | 9/1997 | Hwang |
| 5,666,531 A | 9/1997 | Martin |
| 5,684,532 A | 11/1997 | Ely |
| 5,689,815 A | 11/1997 | Yamazaki |
| 5,701,157 A | 12/1997 | Kato |
| 5,710,981 A | 1/1998 | Kim |
| 5,752,171 A | 5/1998 | Akiya |
| 5,774,797 A | 6/1998 | Kawano |
| 5,781,150 A | 7/1998 | Norris |
| 5,790,477 A | 8/1998 | Hauke |
| 5,793,923 A | 8/1998 | Sawanobori |
| 5,818,182 A | 10/1998 | Viswanadham |
| 5,828,406 A | 10/1998 | Parulski et al. |
| 5,832,373 A | 11/1998 | Nakanishi |
| 5,847,758 A | 12/1998 | Iizuka |
| 5,903,309 A | 5/1999 | Anderson |
| 5,966,122 A | 10/1999 | Itoh |
| 5,966,171 A | 10/1999 | Hieda |
| 5,982,298 A | 11/1999 | Lappenbusch |
| 5,986,698 A * | 11/1999 | Nobuoka ........... H04N 5/23248 |
| | | 348/208.3 |
| 6,002,429 A | 12/1999 | Ochi |
| 6,005,613 A | 12/1999 | Endsley |
| 6,018,363 A | 1/2000 | Horii |
| 6,020,920 A | 2/2000 | Anderson |
| 6,031,999 A | 2/2000 | Ogawa |
| 6,049,704 A | 4/2000 | Peckham |
| 6,078,824 A | 6/2000 | Sogo |
| 6,091,686 A | 7/2000 | Caffarelli |
| 6,122,007 A | 9/2000 | Ishibashi |
| 6,125,326 A | 9/2000 | Ohmura |
| 6,130,710 A | 10/2000 | Yasuda |
| 6,195,125 B1 | 2/2001 | Udagawa et al. |
| 6,208,377 B1 * | 3/2001 | Morofuji ............... G02B 27/646 |
| | | 348/208.3 |
| 6,226,449 B1 | 5/2001 | Inoue et al. |
| 6,230,162 B1 | 5/2001 | Kumar |
| 6,236,863 B1 | 5/2001 | Waldroup |
| 6,262,763 B1 | 7/2001 | Totsuka |
| 6,266,614 B1 | 7/2001 | Alumbaugh |
| 6,288,743 B1 | 9/2001 | Lathrop |
| 6,317,141 B1 | 11/2001 | Pavley |
| 6,320,600 B1 | 11/2001 | Smith et al. |
| 6,321,158 B1 | 11/2001 | DeLorme |
| 6,334,050 B1 | 12/2001 | Sharby |
| 6,335,746 B1 | 1/2002 | Enokida et al. |
| 6,335,760 B1 | 1/2002 | Sato |

(56) References Cited

U.S. PATENT DOCUMENTS

| | | |
|---|---|---|
| 6,411,646 B1 | 6/2002 | Walley |
| 6,434,130 B1 | 8/2002 | Soininen |
| 6,445,412 B1 | 9/2002 | Shiohara |
| 6,512,541 B2 | 1/2003 | Dunton et al. |
| 6,519,000 B1 | 2/2003 | Udagawa |
| 6,529,236 B1 | 3/2003 | Watanabe |
| 6,545,687 B2 | 4/2003 | Scott et al. |
| 6,559,888 B1 | 5/2003 | Doron |
| 6,563,535 B1 | 5/2003 | Anderson |
| 6,564,070 B1 | 5/2003 | Nagamine et al. |
| 6,567,119 B1 | 5/2003 | Parulski |
| 6,661,451 B1 | 12/2003 | Kijima et al. |
| 6,683,649 B1 | 1/2004 | Anderson |
| 6,693,667 B1 | 2/2004 | Doron |
| 6,701,063 B1 | 3/2004 | Komoda et al. |
| 6,727,942 B1 | 4/2004 | Miyano |
| 6,728,476 B1 | 4/2004 | Haseno |
| 6,734,424 B2 | 5/2004 | Lennon et al. |
| 6,734,909 B1 | 5/2004 | Terane |
| 6,750,903 B1 | 6/2004 | Miyatake |
| 6,754,440 B2 | 6/2004 | Takahashi |
| 6,765,616 B1 | 7/2004 | Nakano et al. |
| 6,781,634 B1 | 8/2004 | Shiozaki et al. |
| 6,798,448 B1 | 9/2004 | Motono et al. |
| 6,856,760 B2 | 2/2005 | Takahashi |
| 6,876,387 B1 | 4/2005 | Lee |
| 6,882,366 B1 | 4/2005 | Kijima |
| 6,906,746 B2 | 6/2005 | Hijishiri et al. |
| 6,937,273 B1 | 8/2005 | Loui |
| 6,937,277 B1 | 8/2005 | Hattori |
| 6,970,191 B1 | 11/2005 | Sase et al. |
| 7,154,539 B1 | 12/2006 | Nishimura et al. |
| 7,352,391 B1 | 4/2008 | Hatakeyama |
| 7,403,226 B2 | 7/2008 | Nakano et al. |
| 7,519,268 B2 | 4/2009 | Juen |
| 7,903,162 B2 | 3/2011 | Juen |
| 8,059,177 B2 | 11/2011 | Nakano et al. |
| 8,704,768 B2 | 4/2014 | Juen |
| 8,736,729 B2 * | 5/2014 | Nakano ............... H04N 5/23248 348/294 |
| 9,100,604 B2 | 8/2015 | Nakano |
| 9,544,517 B2 | 1/2017 | Nakano |
| 2002/0000998 A1 | 1/2002 | Scott et al. |
| 2002/0054218 A1 | 5/2002 | Kobayashi et al. |

FOREIGN PATENT DOCUMENTS

| | | |
|---|---|---|
| JP | 04-323973 | 11/1992 |
| JP | 6-60158 A | 3/1994 |
| JP | 9-270959 | 10/1997 |
| JP | 9-275351 A | 10/1997 |
| JP | 11-004456 | 1/1999 |
| JP | 11-187306 | 7/1999 |
| JP | 11-355665 | 12/1999 |
| WO | 98/28843 A1 | 7/1998 |

OTHER PUBLICATIONS

ZTE (USA) Inc.'s Invalidity Contentions which were filed in the following litigation: *Hitachi Maxell, Ltd.* v. *Huawei Device USA Inc. and Huawei Device Co., Ltd.*, Civil Action No. 5:16-cv-00178 RWS (E.D. Tex.) and v. *ZTE Corp. and ZTE USA Inc.*, Civil Action No. 5:16-cv-00179 RWS (E.D. Tex.), filed Jun. 30, 2017.
Asustek Computer Inc. and Asus Computer International's Invalidity Contentions which were filed in the following litigation: *Maxell, Ltd.* v. *Asustek Computer Inc. and Asus Computer International*, Civil Action No. 2:17-cv-7528-R-MRW (C.D. CA), filed Mar. 26, 2018.
*Asustek Computer Inc. and Asus Computer International* v. *Maxell, Ltd.*, Petition for Inter Partes Review of U.S. Pat. No. 7,403,226, Inter Partes Review No. IPR2019-00068 dated Oct. 16, 2018.
*Asustek Computer Inc. and Asus Computer International* v. *Maxell, Ltd.*, Petition for Inter Partes Review of U.S. Pat. No. 9,544,517, Inter Partes Review No. IPR2019-00069 dated Oct. 16, 2018.
*BlackBerry Corporation* v. *Maxell, Ltd.*, Petition for Inter Partes Review of U.S. Pat. No. 6,765,616, Inter Partes Review No. IPR2019-00087 dated Oct. 15, 2018.
*BlackBerry Corporation* v. *Maxell, Ltd.*, Petition for Inter Partes Review of U.S. Pat. No. 9,100,604, Inter Partes Review No. IPR2019-00097 dated Oct. 16, 2018.
"Retrieval and Browsing of Images Using Image Thumbnails," by Harvey A. Cohen, published in the Journal of Visual Computing and Image Representation, vol. 8, No. 2, Jun. 1997, pp. 226-234.
Sony DCS F55/F55E Manual, 1999.
Sony Digital Still Camera MVC-FD81, 1998, Manual.
Sony MVC-FD83/FD88, 1999, Manual.
Sony MVC-FD91 Manual, version 1.0, 1998.
Sony DCS-F55/F55E Service Manual (Ver. 1.1, Jul. 1999).
Sony MVC-FD91 Service Manual (Ver. 1.0, Oct. 1998).
A. Abidi "Direct-Conversion Radio Transceivers for Digital Communications," IEEE Journal of Solid-State Circuits, vol. 30, No. 12, Dec. 1995.
F. Adachi et.al. "Wideband DS-CDMA for Next-Generation Mobile Communications Systems," published Sep. 1998 IEEE Communications Magazine.
F. Cheng, "A New Approach to Dynamic Range Enhancement," Oct. 1994.
A. Salmasi and K. Gilhousen, "On the System Design Aspects of Code Division Multiple Access (CDMA) Applied to Digital Cellular and Personal Communications Networks" IEEE 1991 (57-62).
"Digital Still Camera Image File Format Standard version 2.1", Japan Electronic Industry Development Association (JEIDA), Jun. 12, 1998. pp. 1-166.
Hitachi, "MPEGCAM MP-EG1A Instruction Manual", 1997, E1-E98, Japan.
"FlashPix Format Specification version 1.0", Sep. 11, 1996, pp. 1-130.
"FlashPix format and Architecture White Paper", Jun. 17, 1996, pp. 1-27, Eastman Kodak Company, Rochester, NY.
'The Hitchhiker's Guide to ThumbsPlus, Where are your graphics today'?, Apr. 6, 1999, pp. 1-86, Cerious Software, Inc..
Introducing Microsoft Windows 98, 1997, 6 pages. Redmond, WA.
Hamilton, E., "JPEG File Interchange Format version 1.02", Sep. 1, 1992, pp. 1-8, Milpitas, CA.
Cowart, R., "Mastering Windows 98", 1998, pp. HUAWEI-HM_0028293-HUAWEI-HM_0028316.
Livingston, B. et al., "More Windows 98 Secrets", 1999, pp. HUAWEI-HM_0028317-HUAWEI-HM_0028327.
"The Institute of Electronics, Information and Communication Engineers Technical Report", IEICE Technical Report, Feb. 24, 1987, pp. 53-60, vol. 86, No. 358, Tokyo, Japan.
Norton, P. "Peter Norton's Complete Guide to Windows 98", 1998, pp. HUAWEI-HM_0028452-HUAWEI-HM_0028463.
Karp, D. A., "Windows 98 Annoyances", 1998, pp. 133-135, USA.
Livingston, B. et al., "Windows 98 Secrets", pp. 200-201, IDG Books Worldwide, Inc., Foster City, CA, 1998.
"Kodak Professional DCS 300 Series Digital Cameras User's Guide", pp. 1-1-F-1.
"Adobe Photoshop version 5.0 User Guide", pp. 1-390, 1998, USA.
Imaide, T. et al., "Hitachi Review of PC Data-Compatible MPEG Camera", Article, Oct. 1997, pp. 227-230, vol. 46, No. 5.
Takahashi, M. et al., "A Low-Power MPEG-2 Codec LSI for Consumer Cameras", International Conference on Consumer Electronics, Jun. 28, 1999, pp. 501-506.
Kurashige, T. et al., "Development of MPEG Camera", 1997 IEEE International Symposium on Consumer Electronics, 1997, pp. 218-221.
Secretary's Office of Hitachi, Ltd., "Hitachi Introduces World's First MPEG Camera in Japan", Press Release, Jan. 27, 1997, pp. 1-4.
Sony, "Digital Still Camera Operating Instructions", 1999, pp. HUAWEI-HM_0027470-HUAWEI-HM_0027577, Japan.
Nikon, "Digital Camera Coolpix 900 Reference Manual", 1998, pp. 1-79.

(56) References Cited

OTHER PUBLICATIONS

Kodak, "Kodak DC215 Zoom Digital Camera User's Guide", 1999, pp. 1-78.
Japan Electronic Industry Development Association, "Design Rule for Camera File System, version 1.0", Established Dec. 1998, pp. 1-47.
"Proceedings of 1997 IEEE International Symposium on Consumer Electronics", Dec. 2-4, 1997, pp. 1-8.
Slocombe, M., "Sony Cybershot DCS-F55E Review", Internet Magazine, Jun. 1999, URL: http://www.urban75.org/photos/sony00.html.
UBM Electronics, "Hitachi Develops Prototype MPEG Camera" EE | Times, Nov. 15, 1996, URL: https://www.eetimes.com/document.asp?doc_id=1209392.
Shinnick, J., "Hitachi MPEG Cam Makes Moves", Mar. 23, 1998, TidBITS Publishing Inc., URL: https://tidbits.com/1998/03/23/hitachi-mpeg-cam-makes-moves/.
Sasama, J. et al., "Multimedia Information Systems Applying MPEGCAM", Hitachi Review, 1999, vol. 48, No. 1, pp. 44-46.
Hitachi, Ltd., "Hitachi Home Electronics (America), Inc. Announces Compatibility of Mpeg Digital Video Camera with Microsoft Directshow", Press Release, Oct. 6, 1997, URL: http://www.hitachi.us/press/archive/10061997.
Cohen, H. A., "Access and Retrieval from Image Databases Using Image Thumbnails, International Symposium on Signal Processing and its Applications", Aug. 25-30, 1996.
Aliftiras, G., "Receiver Implementations for a CDMA Cellular System", Jul. 1996, pp. 1-121.
Kim, S. et al., "Development of Mobile Station in the CDMA Mobile System", Oct. 3, 1997, pp. 202-227, vol. 19, No. 3.
Shin, S. et al., "The CDMA Mobile System Architecture", Oct. 3, 1997, pp. 98-115, vol. 19, No. 3.
Kinugasa, T. et al., "A Video Pre/Post-Processing LSI for Video Capture", IEEE Transactions on Consumer Electronics, Aug. 1996, pp. 776-780, vol. 42, No. 3.
Asada, K. et al., "Development of Low Power MPEG1/JPEG Encode/Decode IC", IEEE Transactions on Consumer Electronics, vol. 43, No. 3, Jun. 1997.
"Hitachi's Multimedia Solutions," Hitachi Review, Oct. 1997, vol. 46, No. 5.
"Windows Tips, Use Thumbnail View to see many files at once; make My Documents your own; life after Active Desktop," PC World, Oct. 19, 1999, pp. 1-5.
ThumbsPlus Manual "Supported File Types," Feb. 11, 1998, URL: www.cerious.com.
"The Hitchhiker's Guide to ThumbsPlus," Cerious SoftwareManual, 1993.
ThumbsPlus Manual "Release Notes," Version3.10 Release Notes, 1997.
Lowe, "Using Agent-Based Technology to Create a Cost Effective,Integrated Multimedia View of the Electronic Medical Record," Amia, Inc., 1995, University of Pittsburgh, Pittsburgh, PA.
McCleskey, "Which Camera Should you Bring on Vacation?" Videomaker, Nov. 1, 1997.
"First Looks: The Digital Chameleon at 72", MP-EG1 PC Mag, PC Magazine.
CNET News Staff, "Short take: MPEG camera now works with MAC," c|net, Jul. 30, 1997 (CBS Interactive Inc.).
*Olympus Corporation, Olympus Corporation of the Americas and Olympus America Inc.* v. *Maxell, Ltd.*, Petition for Inter Partes Review of U.S. Pat. No. 8,339,493, Inter Partes Review No. IPR2018-00904 dated Jun. 20, 2018.
*Olympus Corporation, Olympus Corporation of the Americas and Olympus America Inc.* v. *Maxell, Ltd.*, Petition for Inter Partes Review of U.S. Pat. No. 9,100,604, Inter Partes Review No. IPR2018-00908 dated Jun. 20, 2018.
*Olympus Corporation, Olympus Corporation of the Americas and Olympus America Inc.* v. *Maxell, Ltd.*, Petition for Inter Partes Review of U.S. Pat. No. 9,100,604, Inter Partes Review No. IPR2018-00909 dated Jun. 20, 2018.
*Olympus Corporation, Olympus Corporation of the Americas and Olympus America Inc.* v. *Maxell, Ltd.*, Petition for Inter Partes Review of U.S. Pat. No. 8,059,177, Inter Partes Review No. IPR2018-00910 dated Jun. 20, 2018.
Apple Inc.'s Invalidity Contentions which were filed in the following litigation: *Maxell, Ltd.* v. *Apple Inc.*, Civil Action No. 5:19-cv-00036-RWS (E.D. TX), filed Aug 14, 2019.
The Sony Digital Video Recorder (DCR-TRV900) User Manual ("DCR-TRV900 Manual"), Published by Sony Corporation in 1998.
Sony Consumer Electronics Guide: DCR-TRV900—More Specifications, webpage published by Sony Corporation, Apr. 24, 1999, URL: https://web.archive.org/web/19990424085854/http://www.sel.sony.com/SEL/consumer/ss5/office/camcorder/digitalvideoproducts/dcr-trv900_specs.shtml.
Sony Consumer Electronics Guide: DCR-TRV900—More Specifications, webpage published by Sony Corporation, Jan. 28, 1999, URL: https://web.archive.org/web/19990128112515/http://www.sel.sony.com:80/SEL/consumer/ss5/office/camcorder/digitalvideoproducts/dcr-trv900.shtml
Getting Started With the QuickTake 200 Camera, "QuickTake 200 User's Manual", published by Apple Inc. in 1997.
Published advertisement from The Indianapolis News (Indianapolis, Indiana) dated Sep. 4, 1998.
Published advertisement from The Indianapolis News (Indianapolis, Indiana) dated Sep. 12, 1998.
Published advertisement from The Daily Sentinel (Grand Junction, Colorado) newspaper dated Sunday, Jun. 13, 1999.
Digital Camcorder, JVC GR-DVL9600 GR-DVL9500 User's Manual, "JVCVRDVL9500 Manual", published by the Victor Company of Japan, Ltd. in 1999
Excerpts from the JVC America website published (from https://web.archive.orgweb/199901170035015/http://jvc-america.com:80/digital_camcorders/digital_camcorders.html).
Published review from the Iowa City Press (Iowa City, Iowa) newspaper dated Jan. 12, 1999.
Published advertisement from The Courier-News (Bridgewater, New Jersey) newspaper dated Feb. 17, 1999.
J. Ozer, "Digital Video Cameras," PC Magazine, vol. 18, No. 7, Apr. 6, 1999.
Published advertisement from Popular Photography magazine dated Oct. 1999.

\* cited by examiner

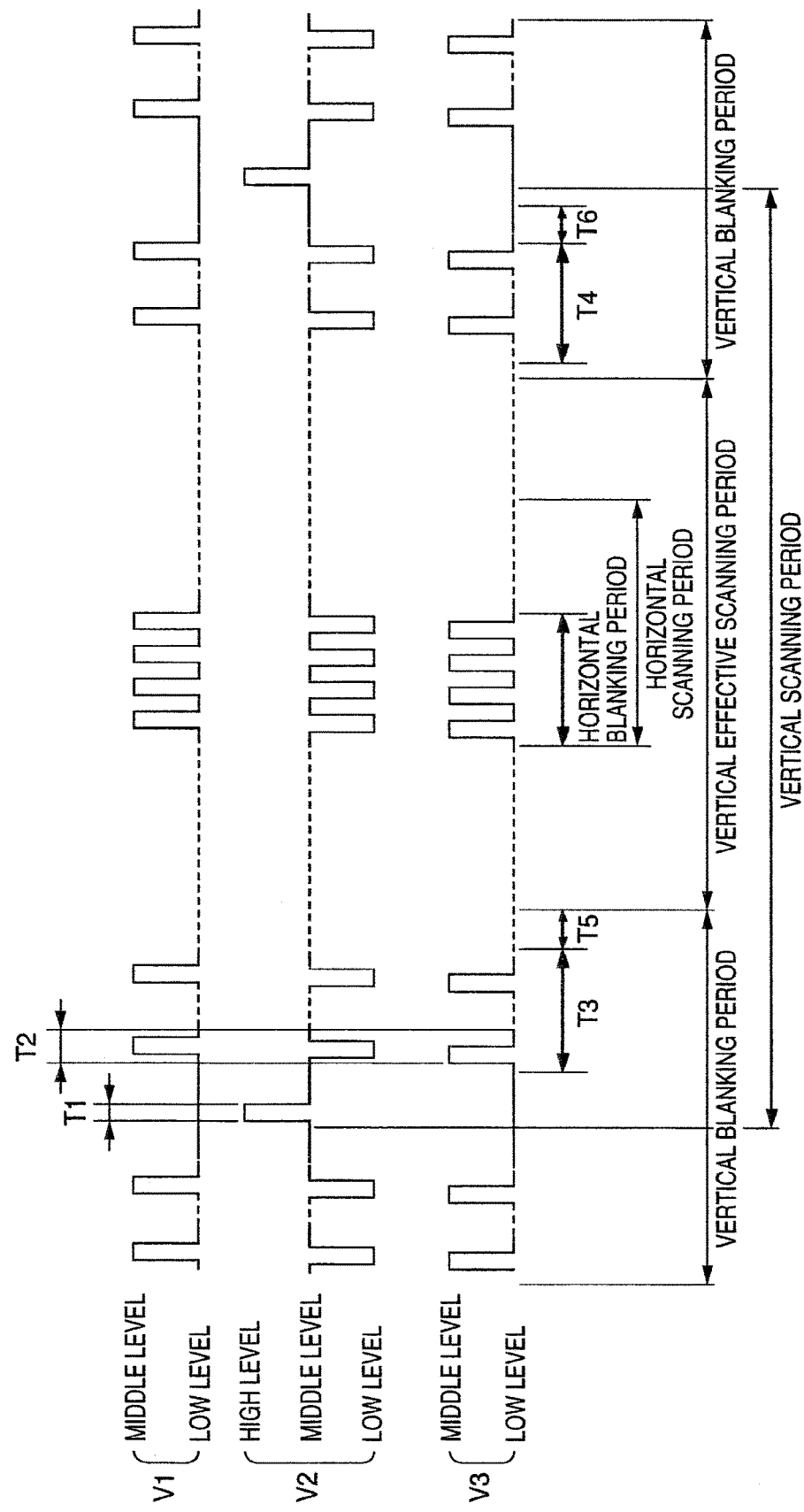

AREA A : 960HIGH x 1280WIDE

AREA B : 720HIGH x 960WIDE

AREA C : 480HIGH x 640WIDE

FIG.10
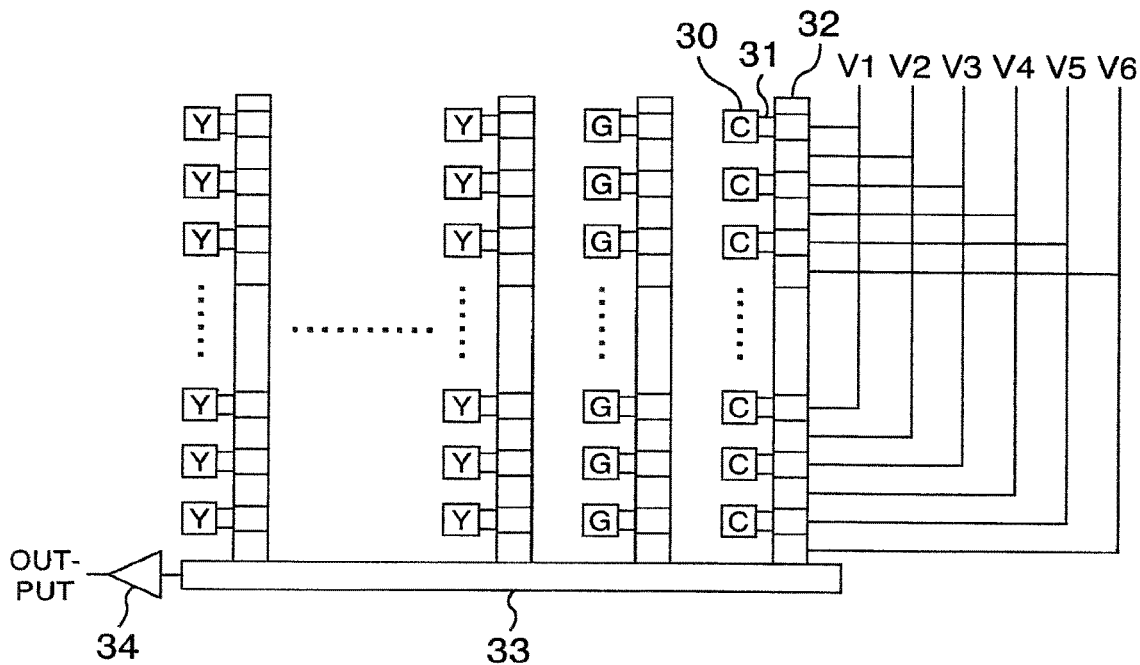
FIG.12
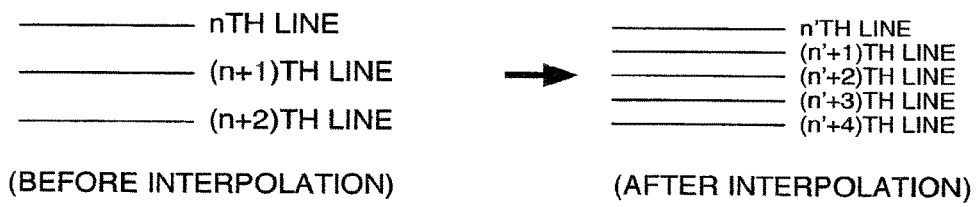
(BEFORE INTERPOLATION)      (AFTER INTERPOLATION)
FIG.13A
| Ye | W | Cy |
|----|---|----|
| Ye | W | Cy |
| Ye | W | Cy |
| Ye | W | Cy |
| Ye | W | Cy |
FIG.13B
| R | G | B |
|---|---|---|
| R | G | B |
| R | G | B |
| R | G | B |
| R | G | B |

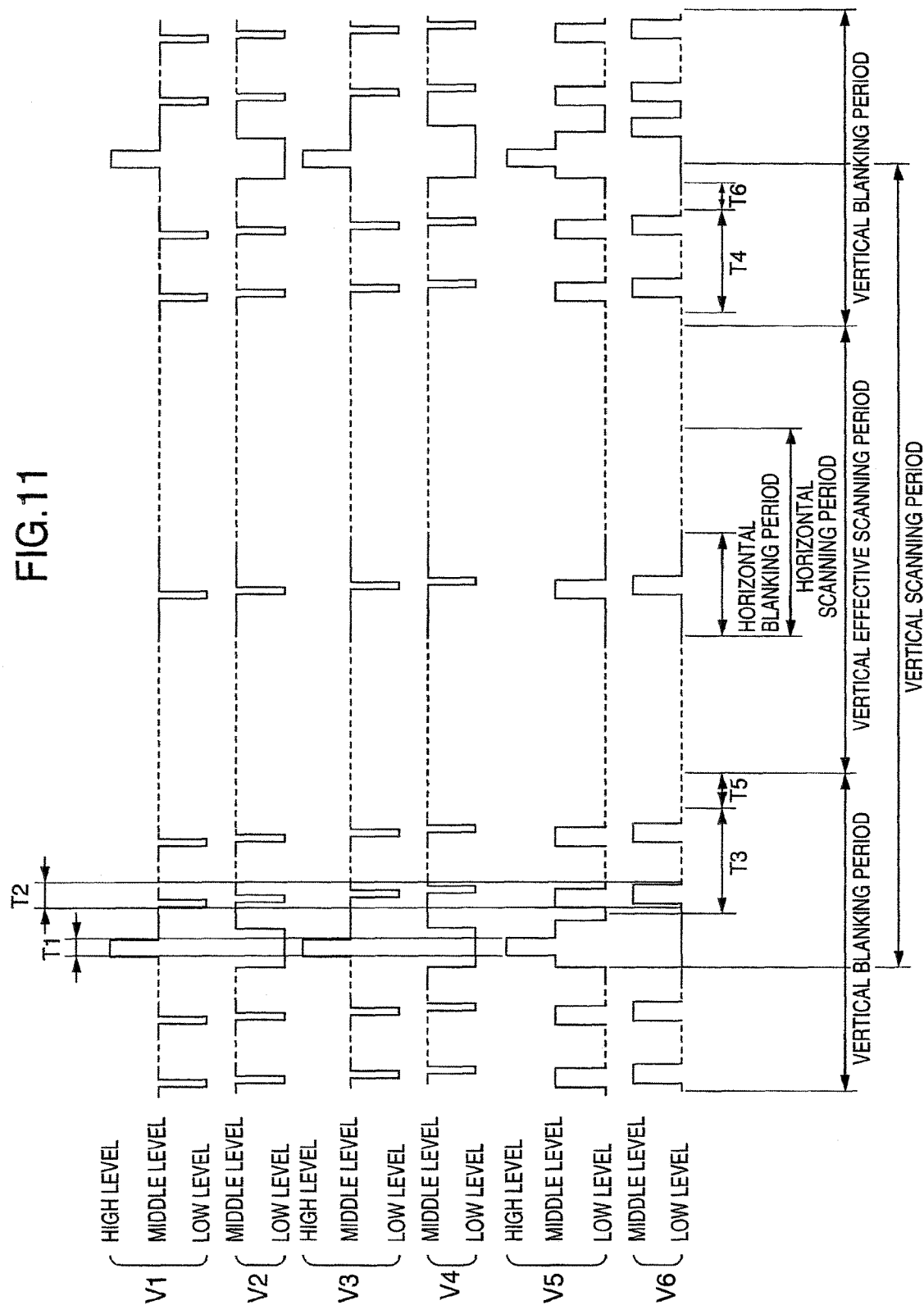

ELECTRIC CAMERA

CROSS REFERENCE TO RELATED APPLICATION

This application is a continuation of U.S. patent application Ser. No. 15/386,656, filed Dec. 21, 2016, which is a continuation of U.S. patent application Ser. No. 14/661,227 filed Mar. 18, 2015, now U.S. Pat. No. 9,544,517, which is a continuation of U.S. patent application Ser. No. 14/264,243, filed Apr. 29, 2014, now U.S. Pat. No. 9,100,604, which is a continuation of U.S. application Ser. No. 13/681,495, filed Nov. 20, 2012, now U.S. Pat. No. 8,736,729, which is a continuation of U.S. application Ser. No. 12/845,266, filed Jul. 28, 2010, now U.S. Pat. No. 8,339,493, issued Dec. 25, 2012, which is a continuation of U.S. application Ser. No. 10/660,710, filed Sep. 12, 2003, now U.S. Pat. No. 8,059,177, issued Nov. 15, 2011, and is related to U.S. application Ser. No. 10/660,711, filed Sep. 12, 2003, now U.S. Pat. No. 7,403,226, issued Jul. 22, 2008, both of which are divisional applications of U.S. application Ser. No. 09/520,836, filed Mar. 8, 2000, now U.S. Pat. No. 6,765,616, issued Jul. 20, 2004, the subject matter of all the above is incorporated by reference herein.

BACKGROUND OF THE INVENTION

The present invention relates to a photography related to video cameras, camcorders, digital still cameras and others using a solid-state image sensing device, and more particularly to an electric camera using a solid-state image sensing device with a large number of pixels.

Electric cameras using solid-state image sensors such as CCDs (charge-coupled devices) include a so-called video camera or camcorder for taking moving images and a so-called digital still camera for taking still images. In recent years, video cameras with a still image taking function and digital still cameras with a moving image taking function have become available.

In a video camera to photograph moving images, it is generally assumed that the video is viewed on a display such as television monitor and thus the camera is designed to produce output signals conforming to a television system such as NTSC and PAL. Therefore, the effective number of vertically arranged pixels or picture elements on the image sensing device used in such a camera is determined to enable television signals to be generated. The NTSC system, for example, performs interlaced scanning on two fields, each of which has an effective scanning line number of about 240 lines (the number of scanning lines actually displayed on the monitor which is equal to the number of scanning lines in the vertical blanking period subtracted from the total number of scanning lines in each field). To realize this, the image sensing device has about 480 pixel rows as the standard effective number of vertically arranged pixels. That is, the signals of two vertically adjoining pixels in each field are mixed together inside or outside the image sensing device to generate about 240 scanning lines, and the combinations of pixels to be cyclically mixed together are changed from one field to another to achieve the interlaced scanning.

Some image sensing devices to take moving images according to the NTSC system have an area of pixels for image stabilization added to the area of effective pixel area, thus bringing the effective number of vertically arranged pixels to about 480 or more. In this case, an area beyond 480th pixels is read out at high speed during the vertical blanking period and therefore the signals thus read out are not used as effective signals. Therefore, the video signals can only be generated from those signals coming from the area of about 480 vertically arranged pixels. When such a camera is used to photograph a still image, it is relatively easy to generate a static image signal conforming to, for example, JPEG (Joint Photographic Expert Group) from the signals coming from the same pixel area that is used to take a moving image. A problem remains, however, that the number of vertically arranged pixels obtained is limited to around 480, making it impossible to produce more detailed static image signals.

In a camera having an image sensing device with the area of pixels for image stabilization mentioned above, a method of alleviating this problem may involve using the entire area of effective pixels including the area of image stabilization pixels in photographing a still image. Even when photographing a still image, however, the photographed image needs to be monitored for check and, for that purpose, it is necessary to generate signals conforming to the television system from signals read out from all effective pixels.

An example of such a conventional camera has been proposed in JP-A-11-187306. In the camera disclosed in this publication, signals from all the effective pixels are read out taking two or more times the field period of the television system, stored in a memory means such as a field memory, and then subjected to interpolation processing for transformation into signals conforming to the field cycle and horizontal scan cycle of television.

This conventional camera, however, requires a large processing circuit, such as field memory, for signal conversion. Another drawback is that the image sensing device readout cycle is a plurality of times the field cycle, degrading the dynamic resolution. Even with the use of this circuit, the number of pixels obtained as the static image signals is limited to the number of effective pixels used for moving videos plus the area of image stabilization pixels.

In a digital still camera designed for taking still images, there has been a trend in recent years toward an increasing number of pixels used on the moving video image sensing device in order to obtain higher resolution static image signals. When taking a moving image or monitoring the video, it is necessary to generate signals that conform to the television system. The number of pixels on such an image sensing device, however, does not necessarily match the number of scanning lines of the television system and therefore some form of conversion means is required.

The conversion means may involve, as in the video camera with the area of image stabilization pixels, reading out signals from the image sensing device taking a longer time than the field cycle and interpolating them to generate television signals. This method has, in addition to the problem described above, a drawback that the readout cycle increases as the number of pixels increases, further degrading the dynamic resolution.

To mitigate this problem, JP-A-9-270959 discloses an apparatus which mixes together or culls the pixel signals inside the image sensing device to reduce the number of signals to be read and therefore the read cycle. Although this apparatus alleviates the problem of the degraded dynamic resolution, it requires a large processing circuit such as field memory to perform time-axis transformation to generate signals conforming to the television system and the image sensing device itself needs to have a special structure for performing desired mixing and culling.

SUMMARY OF THE INVENTION

The present invention relates to a photography of video cameras, camcorders, digital still cameras and others using a solid-state image sensing device, and more particularly to an electric camera using a solid-state image sensing device with a large number of pixels.

The conventional electric cameras, as described above, have drawbacks that when taking a still picture by using a video camera, the number of pixels is not sufficient and that when taking a moving image with a still camera, the associated circuit inevitably increases and the dynamic image quality deteriorates. Taking both moving and static images of satisfactory quality with a single camera is difficult to achieve. In addition to solving the above problems, to obtain good dynamic picture quality by using an image sensing device having a large number of pixels intended for still images requires extracting a pixel area that is used to realize an image stabilizing function. The conventional art and cameras do not offer a means to accomplish this function.

An object of the present invention is to provide an electric camera that solves these problems and which uses an image sensing device with a sufficient number of pixels for still images and enables taking of highly detailed still images and a moving video taking with reduced image quality degradation without increasing circuitry such as field memory. It is also an object of the present invention to provide an electric camera that can also realize the image stabilizing function.

According to one aspect of this invention, the electric camera to realize the above objectives has: an image sensing device with a light receiving surface having N vertically arranged pixels and an arbitrary number of pixels arranged horizontally, N being equal to or more than three times the number of effective scanning lines M of a display screen of a television system; a driver to drive the image sensing device to vertically mix or cull signal charges accumulated in individual pixels of every K pixels to produce a number of lines of output signals which corresponds to the number of effective scanning lines M, K being at least one of integers equal to or less than an integral part of a quotient of N divided by M (a number of lines of output signals corresponds to 1/K the number of vertically arranged pixels N of the image sensing device); and a signal processing unit to generate image signals by using the output signals of the image sensing device.

As explained above, since this invention eliminates the limit on the number of vertically arranged pixels, an electric camera can be provided which enables taking of highly detailed still images and a satisfactory moving video taking by using an image sensing device with a large enough pixel number even for still images.

BRIEF DESCRIPTION OF THE DRAWINGS

FIG. 3 is a drive pulse timing diagram in the first embodiment of the electric camera of the invention.

FIG. 10 is a schematic diagram showing the structure of an image sensing device in a third embodiment of the electric camera according to the present invention.

FIG. 11 is a drive pulse timing diagram in the third embodiment of the electric camera of the invention.

FIG. 12 is a schematic diagram showing an interpolation operation in the third embodiment of the electric camera of the invention.

FIGS. 13A and 13B are schematic diagrams showing the arrangement of color filters in the image sensing device in a fourth embodiment of the electric camera according to the present invention.

DESCRIPTION OF THE EMBODIMENTS

Figure 1:
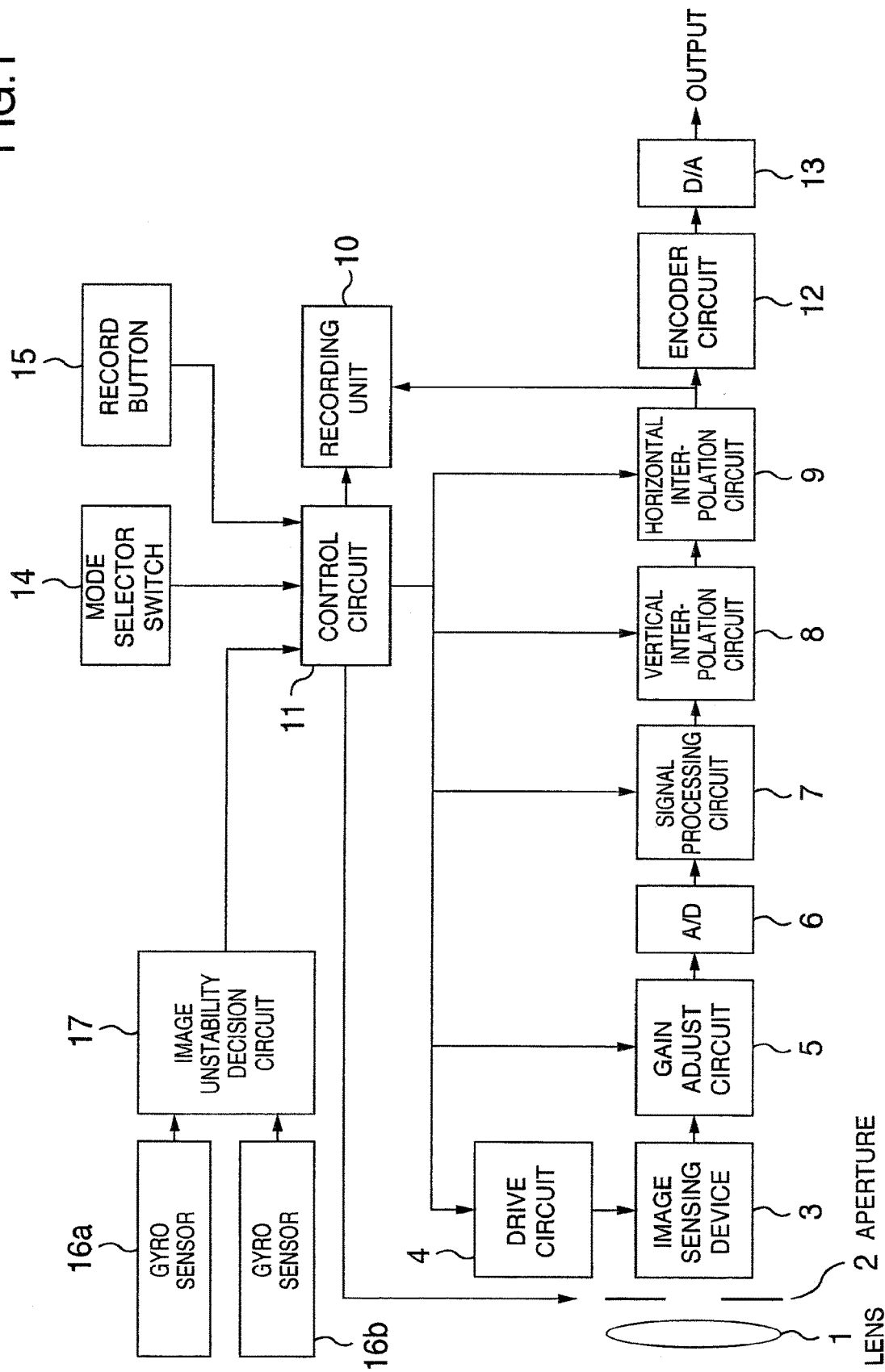
FIG. 1 is a block diagram showing the configuration of a first embodiment of an electric camera according to the present invention.

Now embodiments of the present invention will be described by referring to the accompanying drawings. FIG. 1 is a block diagram showing the configuration of one embodiment of an electric camera according to the invention.

In FIG. 1, reference number 1 represents a lens, 2 an aperture, 3 an image sensing device, 4 a drive circuit, 5 a gain adjust circuit, 6 an analog-digital (A/D) conversion circuit, 7 a signal processing circuit, 8 a vertical interpolation circuit to perform interpolation in a vertical direction, 9 a horizontal interpolation circuit to perform interpolation in a horizontal direction, 10 a recording unit including recording media such as magnetic tape, semiconductor memory and optical disk to record a video signal, 11 a control circuit to control these constitutional elements according to the operating state, 12 an encoder circuit to modulate the video signal into a standard television signal, 13 a digital-analog (D/A) conversion circuit, 14 a mode selector switch to change over the operation mode between the moving video taking and the still image taking, 15 a record button to start or stop the recording, 16a and 16b gyro sensors to detect vertical image-unstability and lateral image-unstability, respectively, and 17 an image-unstability decision circuit to determine the image-instability from signals output from the gyro sensors.

Figure 2:
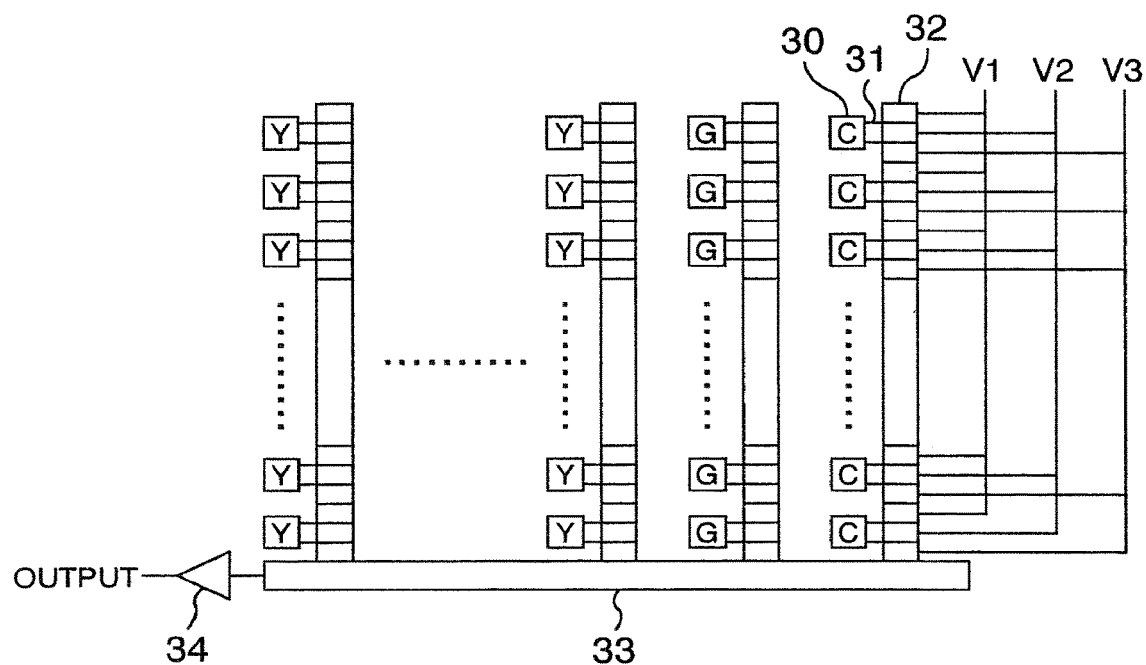
FIG. 2 is a schematic diagram showing the structure of an image sensing device in the first embodiment of the electric camera of the invention.

In the above configuration, light coming from the lens 1 through the aperture 2 is focused on a light receiving surface of the image sensing device 3 where it is converted into an electric signal. In this embodiment the image sensing device 3 is of a CCD type. FIG. 2 shows the structure of this image sensing device 3. In FIG. 2, denoted 30 are pixels each formed of a photodiode, which are arranged horizontally and vertically in a grid pattern. On these grid-arrayed pixels three types of color filters that pass yellow (Ye), green (G) and cyan (Cy), respectively, are arranged in such a way that the combination of these three colors is repeated horizontally every three pixels and that the filters of the same colors are lined vertically in so-called vertical stripes. Although an arbitrary number of pixels may be used, this embodiment has an array of 1200 pixels vertically and 1600 pixels horizontally. A vertical transfer unit 32 is a CCD which is driven by three phase pulses V1, V2, V3. This CCD has a three-gate structure in which each pixel corresponds to three phase pulses and thus can vertically transfer a signal charge of each pixel independently. Transfer gates 31 for transferring the charge of each pixel to the vertical transfer unit 32 are commonly connected to a gate of the vertical transfer unit 32 that corresponds to the V2 pulse. An operation to transfer the charge from each pixel to the vertical transfer unit 32 in response to a peak value of the pulse applied to the commonly connected gate and an operation to transfer the charge vertically are performed separately. A horizontal transfer unit 33 horizontally transfers the charges supplied from the vertical transfer units 32 and outputs them successively through an output amplifier 34 from the output terminal.

Referring back to FIG. 1, the operation performed when the moving video mode is selected by the mode selector switch 14 will be explained. The number of vertically arranged pixels on the image sensing device in this embodiment is 1200, so if the number of effective scanning lines in the field of the NTSC system is assumed to be 240 lines, then vertically mixing five pixels (=1200 pixel rows/240 scanning lines) can match the number of lines of output signals from the image sensing device to the number of effective scanning lines.

However, in this embodiment, to realize the image stabilizing function described later, four vertically arranged pixels are mixed together during motion image taking mode. When four vertically arranged pixels are to be cyclically mixed together, the signals from the area of 960 pixels (=240 scanning lines×4 pixels) out of the 1200 vertically arranged pixels are used as effective signals and the remaining 240 pixels (=1200 (all pixels)−960 (effective pixels)) are not used for image forming. FIG. 3 shows the timing of a vertical drive pulse for the image sensing device in this operation mode, with V1, V2 and V3 representing three phase drive pulses applied to each gate of the CCD or vertical transfer unit 32.

In FIG. 3, in a period T1 included in the vertical blanking period, the drive pulse V2 is held high to transfer the signal charge accumulated in each pixel to under the V2 gate of the vertical CCD. Next, in a period T2, while the V2 pulse is still at middle level, the V3 pulse is raised from low level to middle level; next, while the V3 pulse is at middle level, the V2 pulse is changed from middle level to low level, after which the V1 pulse is changed from low level to middle level; next, while the V1 pulse is at middle level, the V3 pulse is changed from middle level to low level, after which the V2 pulse is changed to middle level and finally the V1 pulse is changed from middle level to low level. With this sequence of pulse operations, the signal charges under the V2 gate for one pixel row are transferred and held again under the V2 gate.

By repeating this series of operations, the signal charges for a desired number of pixel rows can be transferred. In FIG. 3, during a period T3 included in the vertical blanking period before the vertical effective scanning period (the vertical scanning period minus the vertical blanking period which corresponds to the actually displayed image) and during a period T4 included in the vertical blanking period after the vertical effective scanning period, the above transfer operation for one pixel row is repeated a total of 240 times to transfer the signal charges of the 240 pixel rows not used for image generation to the horizontal transfer unit 33 during the vertical blanking period. For example, if this transfer operation is performed 120 times during the period T3 and 120 times during the period T4, the signal charges from upper 120 pixel rows and lower 120 pixel rows on the light receiving surface are transferred to the horizontal transfer unit 33 during the period T3 and period T4 within the vertical blanking period. During each of the subsequent periods T5 and T6 in the vertical blanking period, the horizontal transfer unit 33 is driven for a predetermined period to output the charges transferred to the horizontal transfer unit 33 from the output terminal. These charges are not used as valid signals as they are output during the vertical blanking period.

Figure 4:
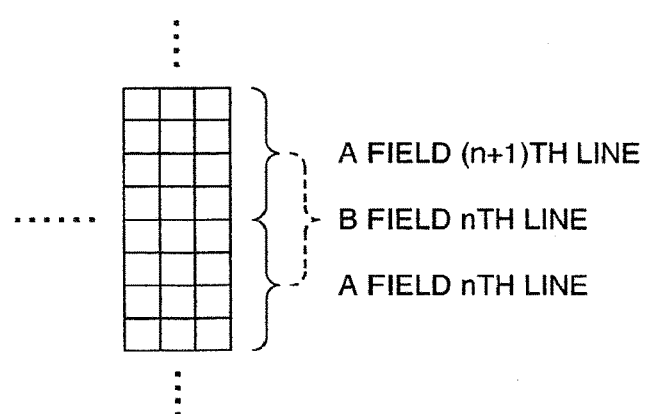
FIG. 4 is a schematic diagram showing a mixing operation in the first embodiment of the electric camera of the invention.

Next, in the vertical effective scanning period of FIG. 3, the above one-pixel-row transfer operation is performed four times during each horizontal blanking period to transfer the signal charges of four pixel rows to the horizontal transfer unit 33 where they are mixed together. Then, during a horizontal effective scanning period (the horizontal scanning period minus the horizontal blanking period which corresponds to the actually displayed image), the horizontal transfer unit 33 is driven to read out the signal charges from the horizontal transfer unit to produce an output signal conforming to the television system. If the above operation is performed on the A field and if, on the B field, the number of pixel rows transferred during the period T3 is set to 122 rows and that during the period T4 is set to 118 rows, then the combination of four pixel rows to be cyclically mixed together shifts by two rows between the two fields, thus allowing the interlaced scanning to be performed as shown in FIG. 4. (FIG. 4 shows the light receiving surface of the image sensing device and its relation to the displayed screen is vertically inverted.)

Let us return to FIG. 1. The output signal from the image sensing device 3 is adjusted in gain by the gain adjust circuit 5 and then converted by the A/D conversion circuit 6 into a digital signal. The digital signal is then processed by the signal processing circuit 7 that performs color signal processing and luminance signal processing, such as generation of color signals, gamma correction, white balance processing and outline enhancement. The image sensing device in this embodiment has an array of vertical stripes of yellow (Ye), green (G) and cyan (Cy) color filters, so the color signals for Ye, G and Cy are obtained as a series of color points from one line of output signals at all times no matter how many pixels are vertically combined. From these color signals three primary color signals R, G, B can be obtained from the following calculations.

$R = Ye - G$ $B = Cy - G$ $G = G$

The R, G and B signals undergoes the white balance processing and gamma correction processing in the signal processing circuit 7 and are then converted into color difference signals such as R-Y, B-Y or U and V. The luminance signals and the color difference signals are then entered through the vertical interpolation circuit 8 into the horizontal interpolation circuit 9. In this operation state the signals just pass through the vertical interpolation circuit 8 without being processed. The horizontal interpolation circuit 9 performs interpolation on the signals in the horizontal direction.

Figure 5:
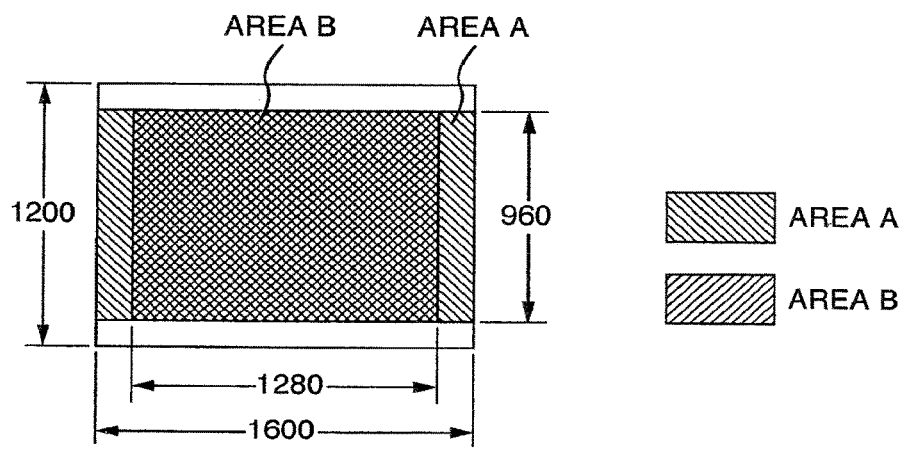
FIG. 5 is a schematic diagram showing a readout area in the first embodiment of the electric camera of the invention.

FIG. 5 shows the light receiving surface of the image sensing device. As described above, in the operating state of this embodiment, the signals read out during the vertical effective scanning period correspond to an area having 960 of the 1200 vertically arranged pixels and a horizontal width of 1600 pixels, as shown shaded at A in FIG. 5. If the entire light receiving surface of the image sensing device has a 4-to-3 (width to height) aspect ratio, the shaded area A is more laterally elongate than this aspect ratio. Hence, if the signals of all horizontal pixels of the light receiving surface are displayed, for example, on an NTSC standard television monitor with the 4-to-3 aspect ratio, the image displayed is compressed horizontally and looks vertically elongate, compared with the original image. It is therefore necessary to output during the horizontal effective scanning period only those signals coming from a pixel area with the horizontal width conforming to the aspect ratio of the television system, as shown by a shaded area B. When the television system has an 4-to-3 aspect ratio, the number of pixels in the horizontal width of the shaded area B is 1280 (=960 (vertical effective pixels)×4/3).

Returning back to FIG. 1, the horizontal interpolation circuit 9 performs interpolation processing on the signals from the horizontal 1280 pixels to expand the signals so that they can be output over the entire horizontal effective scanning period. It also performs switching among different clocks as required. With the above operation, an area having 960 pixels in height and 1280 pixels in width is demarcated from the light receiving surface as signals conforming to the television system. Then, the luminance signal and the color difference signal are encoded by the encoder circuit 12 into television signals, which are then converted by the D/A conversion circuit 13 into analog signals for output. When the recording is specified by the record button 15, the signals are recorded by the recording unit 10. At this time, the signals may be compressed in the MPEG (Moving Picture Expert Group) format.

Next, the image stabilizing operation will be explained. Image-unstability information obtained by the gyro sensors 16a, 16b that detect vertical and horizontal image-unstabilities is entered into the image-unstability decision circuit 17, which checks the received information for the amount and direction of the image-unstability and converts them into the number of pixels in vertical and horizontal directions on the light receiving surface of the image sensing device. Based on the converted pixel numbers, the position of an extracted area (effective pixel area) on the light receiving surface is shifted in a direction that cancels the image-unstability. This can correct the image-unstability. The positional shifting of the extracted area is performed as follows. The shifting in the vertical direction can be made by changing the number of pixel rows transferred during the periods T3 and T4 in FIG. 3 and the shifting in the horizontal direction made by changing the interpolation start position in the horizontal interpolation circuit 9.

The operation during the moving video mode has been described above. Next, the operation performed when the static image mode is selected by the mode selector switch 14 will be explained.

In the static image mode, too, until the recording is requested by the record button 15, the camera outputs signals compatible with the television system to monitor the angle of view. Unlike the moving video photographing, all of the effective pixels on the image sensing device are used in this embodiment during the still image photographing to produce signals with as high a resolution as possible. Hence, during the monitoring the television signals need to be generated from the signals coming from the entire pixel area.

The image sensing device of this embodiment has 1200 vertically arranged pixels, and the number of lines of output signals from the image sensing device can be made to match the number of effective scanning lines of NTSC system, which is assumed to have 240 scanning lines, by vertically mixing five pixels (=1200/240). To make the image sensing device operate in this manner, the one-pixel-row transfer operation is performed five times during each horizontal blanking period in the vertical effective scanning period shown in the pulse timing diagram of FIG. 3. With this operation, the signal charges of five pixel rows can be mixed by the horizontal transfer unit 33. As for the transfer operations during the periods T3 and T4 in the vertical blanking period, because the interlaced scanning is carried out, only two pixel rows are transferred during the period T3 on the B field, with no transfer operations performed in other vertical blanking periods (In this embodiment, 1200/240=5 with no remainder produced, so no further transfer is necessary; if, however, a remainder occurs, the remaining pixels need only be transferred during the periods T3 and T4).

The charges mixed by the horizontal transfer unit 33 are read out by driving the horizontal transfer unit 33 during the horizontal effective scanning period. With the above operations, the signal charges of all pixels on the image sensing device can be read out in a manner conforming to the television system. The output signal from the image sensing device 3 is, as during the moving image photographing, adjusted in gain by the gain adjust circuit 5 and converted by the A/D conversion circuit 6 into a digital signal, which is then subjected to the color signal processing and the luminance signal processing in the signal processing circuit 7 before being entered into the vertical interpolation circuit 8. During the static image monitoring, the vertical interpolation circuit 8 performs a vertical gravity center correction on the received signals.

Figure 6:
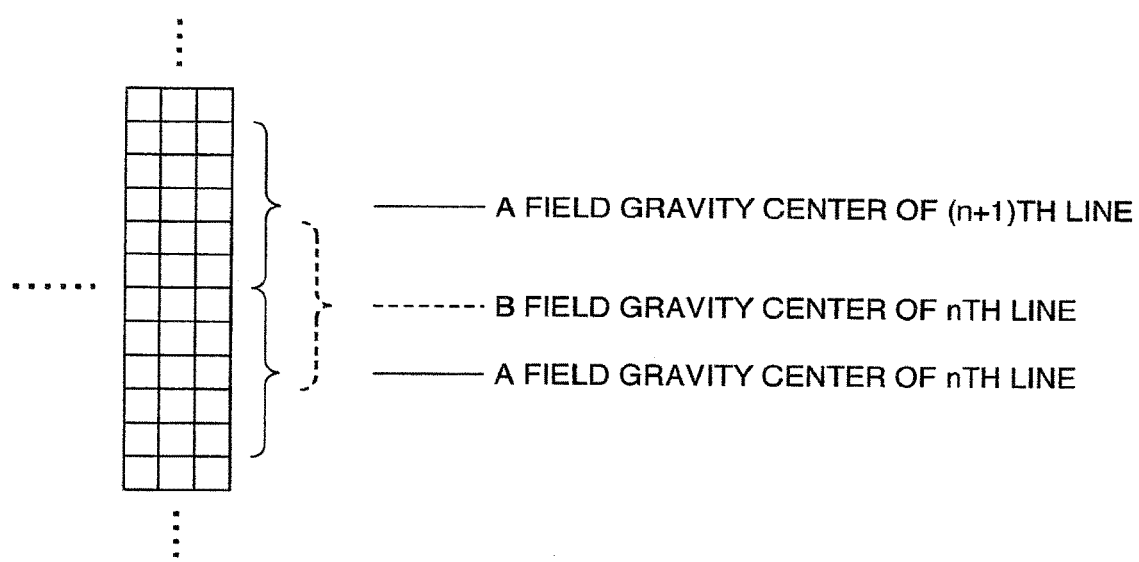
FIG. 6 is a schematic diagram showing a mixing operation in the first embodiment of the electric camera of the invention.

FIG. 6 shows combinations of pixels to be cyclically mixed on the A field and the B field and also the vertical position of the gravity center of the mixed signals. In the interlaced scanning, scanning lines of the A field and the B field are located at the centers of adjoining scanning lines on other field. Hence, the signal samplings in the camera system for the two fields must be 180 degrees out of phase in the vertical direction. In the operating state of this embodiment, however, because five pixels are mixed together, the gravity centers of the output signals for the A field and the B field are deviated 36 degrees (=½ pixel or 1/10 the line-to-line distance on the same field) from the ideal sampling phase difference of 180 degrees, as shown in FIG. 6. To correct this requires generating a signal from two adjoining output lines by interpolation. For example, if we let an nth output line on a field be Sn and an (n+1)th output line on the same field be Sn+1, then a signal Sn' obtained by calculating Sn'=(Sn×9/10)+(Sn+1×1/10) is one whose gravity center is shifted by 1/10 output line from the gravity center of the nth output line toward the (n+1)th output line. The above calculation can also be performed on the signals for the B field to correct the gravity center deviation of sampling. In this embodiment, however, to equalize the effects of interpolation of the A field and the B field, the following calculations are performed to correct the nth output line by 1/20 line toward the (n−1) line on the A field and by 1/20 line toward the (n+1)th line on the B field.

$$Sn'=(Sn \times 19/20)+(Sn-1 \times 1/20) \qquad \text{A field:}$$

$$Sn'=(Sn \times 19/20)+(Sn+1 \times 1/20) \qquad \text{B field:}$$

While this embodiment performs the interpolation based on the calculation of two adjoining lines of output signals, a greater number of lines may be used for the interpolation processing. The output signal of the vertical interpolation circuit 8 is supplied to the horizontal interpolation circuit 9, which in this operating state does nothing but passes the signal. Then, as in the case of the moving image photographing, the signal is encoded by the encoder circuit 12 into a television signal, which is then converted by the D/A conversion circuit 13 into an analog signal for output. As described above, the television signals can be generated from all of the pixel area of the image sensing device also during the static image mode.

Next, the operation performed when the recording is requested by the record button 15 will be described. During the monitoring in the static mode, the signals are mixed together inside the image sensing device to reduce the number of signals and thereby generate television signals. During recording, however, the mixing processing is not performed and all the pixel signals need to be read out independently of each other in order to produce high resolution signals. To realize this, the one-pixel-row transfer operation is performed only once during each horizontal blanking period in the vertical effective scanning period shown in the pulse timing diagram of FIG. 3. This causes only the signal charges for one pixel row to be transferred into the horizontal transfer unit 33, which is then driven to read out the signal charges for one pixel row. Repeating this operation the number of times equal to the number of vertically arranged pixel rows enables the signal charges of all pixel rows to be read out independently of each other. The transfer operation is not done during the periods T3 and T4 in the vertical blanking period.

The signal charges thus read out are adjusted in gain by the gain adjust circuit 5 and converted by the A/D conversion circuit 6 into digital signals, which are then subjected to the color signal processing and the luminance signal processing in the signal processing circuit 7, after which the signals are supplied through the vertical interpolation circuit 8 and the horizontal interpolation circuit 9 to the recording unit 10 where they are recorded. At this time, no interpolation processing is performed by the vertical interpolation circuit 8 or horizontal interpolation circuit 9. The recording unit 10 may compress the signals in the JPEG (Joint Photographic Expert Group) format, for example. Because during the static image recording, no television signal can be generated, an image immediately before starting the recording or a single color image is output as the television signal for monitoring purpose. With the above operation, high resolution signals obtained from all the pixels of the image sensing device can be recorded. Although in this embodiment the recording unit is used commonly for the moving video mode and for the static image mode, dedicated recording units may be provided separately for these modes.

As explained above, since there is no limit on the number of vertically arranged pixels in this embodiment, an image sensing device with a large enough pixel number even for still images can be used to photograph highly detailed still images and satisfactory moving images.

Further, the signal mixing and the vertical signal transfer during the vertical blanking period allow the signals from the image sensing device with a large number of pixels to be read out in a manner that conforms to the television system. This in turn can reduce image quality degradation and realize the moving image photographing with an image stabilizing function and the monitoring during still image photographing.

Only the output signals from that horizontal segment which virtually corresponds to the television system's aspect ratio with respect to the vertical segment are extracted and output over the entire horizontal effective scanning period of the television system. This ensures that the output signals obtained conform to the television system's aspect ratio regardless of the extracted vertical segment position.

Further, the image sensing device is driven in such a way as to shift the position of the pixels to be cyclically mixed together every display cycle of the television system in order to output interlaced signals. With this arrangement, the interlaced scanning can be performed even when an image sensing device with a large number of pixels is used.

Further, the output signals produced by the mixing are interpolated so that the gravity centers of the output signals interlaced every display cycle have a phase difference of 180 degrees in the vertical direction. This ensures that the interlaced output signals have no deviation from the ideal 180-degree phase difference during interlacing even when an interlace phase deviation would normally occur, as when odd numbered pixels are mixed together.

In this embodiment, the image sensing device has 1200 vertically arranged pixels, and four pixels are mixed together during the moving video mode and five pixels during the static image mode. Because the area of image-stabilization pixels may or may not be used and set to any desire size, the number of pixels to be cyclically mixed together in each mode needs only to be equal to or less than the integral part of a quotient of the number of vertically arranged pixels divided by the number of television system's effective scanning lines (in the above example, 5 or less). (The number of vertically arranged pixels does not need to be divisible and, in the above example, may be more than 1200).

The number of vertically arranged pixels for static image photographing needs only to be three or more times the number of effective scanning lines on each field of the television system. In this embodiment the vertically adjoining pixels are mixed together to reduce the number of output lines from the image sensing device during the vertical effective scanning period. The number of lines of output signals can also be reduced by a so-called culling operation, by which only one line of signal charges of pixels is read out for every predetermined number of lines.

While in this embodiment the vertical transfer unit of the image sensing device is formed as a CCD that is driven by three phase pulses for each pixel, the image sensing device may have any desired structure as long as it can realize the mixing or culling of pixels that meets the above conditions.

Although this embodiment described the case of NTSC system, the invention can also be applied to other television systems, such as PAL standard, with different numbers of effective scanning lines.

In summary, a variety of constructions essentially equal in the working principle to this embodiment can be realized by the use of an image sensing device that has an arbitrary number of vertically arranged pixels N three or more times the number of effective scanning lines M of each field of the television system and which allows the vertical mixing or culling of that number of pixels which is at least one of integers equal to or less than the integral part of a quotient of N divided by M (a number of lines of output signals corresponds to 1/K the number of vertically arranged pixels N of the image sensing device).

Figure 7:
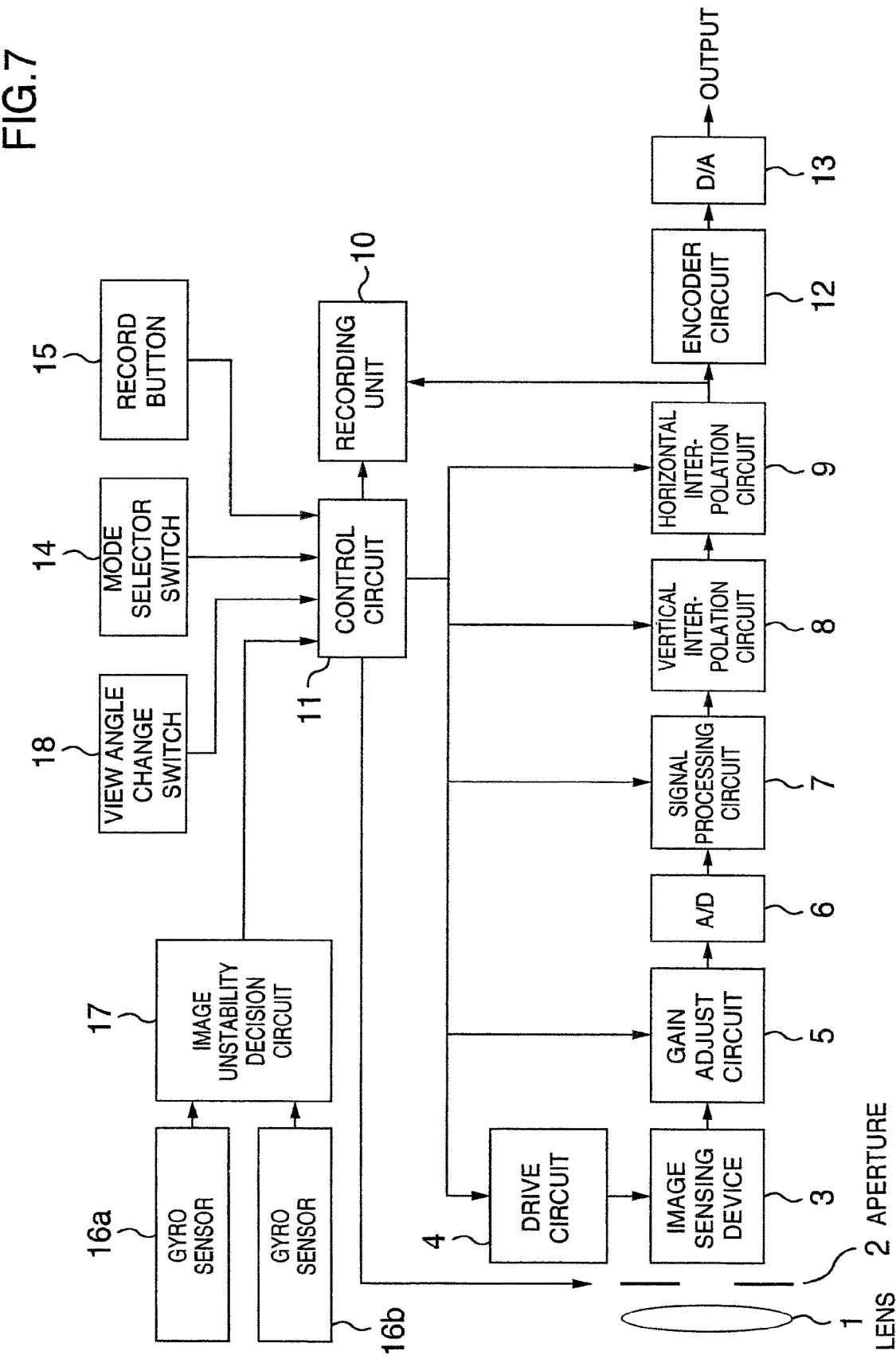
FIG. 7 is a block diagram showing the configuration of a second embodiment of an electric camera according to the present invention.

Next, another embodiment of the present invention will be described by referring to FIG. 7 showing the configuration of the embodiment. The configuration shown in FIG. 7 differs from that of FIG. 1 in that it has a view angle change switch 18. In FIG. 7 constitutional elements identical with those shown in FIG. 1 are assigned like reference numbers and explanations on the constitutional elements performing the same operations as those in FIG. 1 are omitted here.

The operations of the moving video mode, the monitoring during the static image mode and the static image recording are similar in normal condition to the operations of the previous embodiment which was explained with reference to the configuration diagram of FIG. 1. An operation performed when during the moving video mode a request to change the angle of view is made by the view angle change switch 18 will be described.

In the normal condition of this embodiment, as explained in the previous embodiment, the mixing of four vertically arranged pixels, the vertical transfer during the vertical blanking period and the horizontal interpolation processing are performed to extract an area of 960 pixels in height and 1280 pixels in width from the entire pixel area to generate television signals. When a view angle change (which means a zooming function without image quality degradations in the vertical direction) is requested by the view angle change switch 18, three vertically arranged pixels are mixed together and the signals from the excess vertically arranged pixels are read out during the vertical blanking periods before and after the vertical effective scanning period.

In this embodiment, signals of 480 pixels (=1200−240×3) or 160 lines of output signals after mixing (=480/3) need to be read out during the vertical blanking period. This allows the signals of 720 vertically arranged pixels to be read out as 240 lines of output signals conforming to the television system. To carry out this reading requires, in the pulse timing diagram of FIG. 3, transferring the signals of three pixel rows during each horizontal blanking period in the vertical effective scanning period and also transferring a total of 480 pixel rows (=160 lines of output signals) during the T3 and T4 periods in the vertical blanking period. The combinations of pixels to be cyclically mixed together are changed from one field to another to achieve the interlaced scanning.

Figure 8:
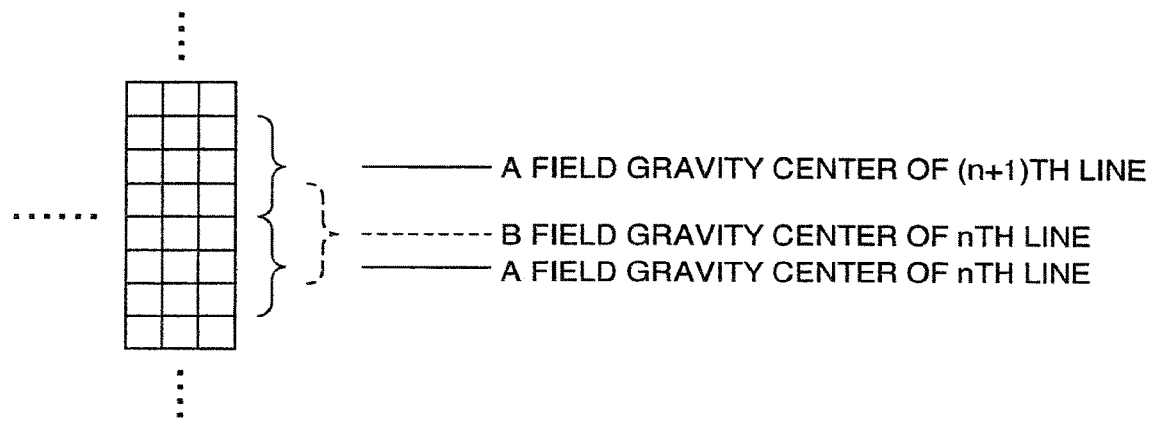
FIG. 8 is a schematic diagram showing a mixing operation in the second embodiment of the electric camera of the invention.
Figure 9:
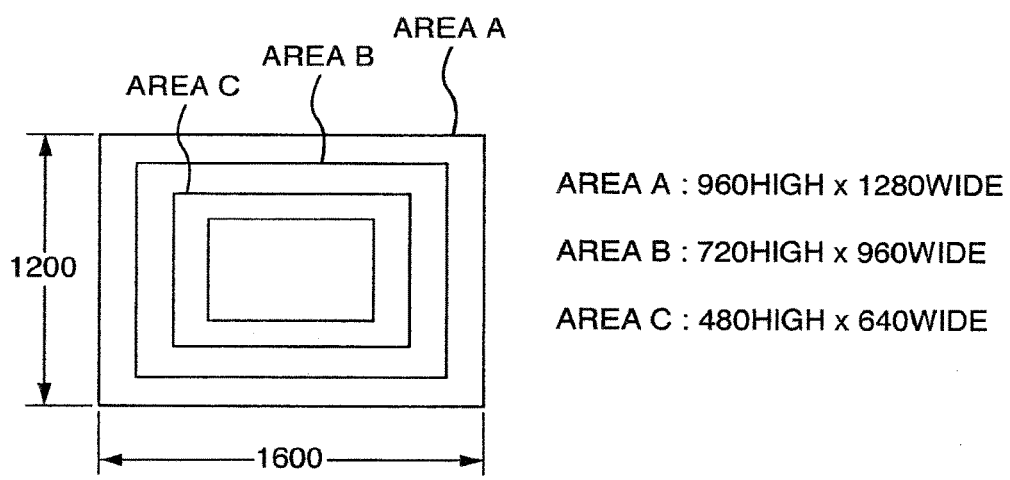
FIG. 9 is a schematic diagram showing a readout area in the second embodiment of the electric camera of the invention.

The output signals of the image sensing device 3 are supplied to the gain adjust circuit 5. Because the signal level produced as a result of the 3-pixel mixing is ¾ the signal level of the 4-pixel mixing, the again of the gain adjust circuit 5 is increased to 4/3 the gain of the 4-pixel mixing to make the 3- and 4-pixel-mixed input signal levels to the subsequent circuit equal. Then, the signals are processed by the A/D conversion circuit 6 and the signal processing circuit 7 before being supplied to the vertical interpolation circuit 8. The combinations of pixels to be cyclically mixed on the A field and the B field and the vertical positions of the gravity centers of the mixed signals are shown in FIG. 8. As in the static image monitoring of the previous embodiment, the phase difference between the two fields is 180 degrees. Because the sampling phases of the fields are deviated from the ideal 180-degree phase difference, the vertical position of the gravity centers are corrected by the vertical interpolation circuit 8. The amount of phase deviation in this operating state is 60 degrees (=½ pixel or ⅙ the line-to-line distance on the same field). To correct the phase deviation evenly on the both fields, the following calculations should be performed.

A field: $Sn' = (Sn \times 11/12) + (Sn-1 \times 1/12)$

B field: $Sn' = (Sn \times 11/12) + (Sn+1 \times 1/12)$

As described earlier, the interpolation processing may use three or more output lines. Next, the horizontal interpolation circuit 9 horizontally expands the signals from that horizontal segment which corresponds to the 4-to-3 aspect ratio with respect to the 720 vertically arranged pixels (i.e., signals from a horizontal 960-pixel segment (=1600×720/1200) in this operating state) so that the expanded signals can be output during the entire horizontal effective scanning period. With the above operation, an area of 720 pixels in height and 960 pixels in width can be extracted from the light receiving surface.

Next, when the view angle change is requested again by the view angle change switch 18, two vertically arranged pixels are mixed together, an area of 480 vertically arranged pixels is read out during the vertical effective scanning period, and the horizontal interpolation circuit 9 expands the signals from the horizontal 640-pixel segment and outputs the expanded signals during the entire horizontal effective scanning period to extract an area of 480 pixels in height and 640 pixels in width. (During the two-pixel mixing, because the interlace phase deviation does not occur, the gravity center position correction by the vertical interpolation circuit 8 is not performed.) If a further view angle change is requested by the view angle change switch 18, the operation is restored to a normal state where four vertically arranged pixels are mixed together.

As a result of the above operation, the area extracted from the light receiving surface of the image sensing device can be changed to three different areas: (A) 960 pixels high by 1280 pixels wide, (B) 720 pixels high by 960 pixels wide and (C) 4880 pixels high by 640 pixels wide. That is, the angle of view can be changed to three different angles. With the area A produced by the 4-pixel mixing taken as a reference, the area B produced by the 3-pixel mixing can provide an image enlarged by 1.33 times and the area C produced by the 2-pixel mixing can provide an image enlarged by two times. It should be noted here that because the three different areas are chosen by changing the number of pixel to be cyclically mixed together in order to make the number of the effective output lines from the imaging device agree with the number of the effective scanning lines of the television system, the angle of view can be changed while maintaining a good image with no image quality degradation in the vertical direction, when compared with an ordinary so-called digital zoom which generates effective scanning lines of signals by interpolating a small number of output lines. During the monitoring of a static image, too, it is possible to perform the similar operation of changing the angle of view by changing the number of pixel rows to be cyclically mixed together.

As described above, in addition to the advantages provided by the previous embodiment, this embodiment can also realize the view angle change with little image quality degradation even for still images by using an image sensing device with a large number of pixels and changing the number of pixels to be cyclically mixed together.

Further, because changes in signal level caused when the number of pixels to be cyclically mixed is changed are absorbed by the gain adjust means, the input signal level to the subsequent signal processing means can be kept constant.

While in this embodiment, the view angle change is performed by the view angle change switch 18, the angle of view may be changed continuously by a zoom switch. In this case, when the magnification factor does not reach the value that is obtained by changing the pixel mixing, the digital zoom performs the ordinary interpolation processing. In this embodiment, when the magnification factor is 1 or more and less than 1.33, the 4-pixel mixing is performed; for the factor of 1.33 or more and less than 2, the 3-pixel mixing is done;

and for the factor of 2 or higher, the 2-pixel mixing is carried out. The mixing operation may be interlocked with an optical zooming mechanism.

Regardless of the number of pixels in the image sensing device, the structure of the image sensing device or the television system employed, this embodiment, as in the previous embodiment, may also use an image sensing device that has an arbitrary number of vertically arranged pixels N three or more times the number of effective scanning lines M of each field and which allows the vertical mixing or culling of those numbers of pixels which are at least two of integers equal to or less than the integral part of a quotient of N divided by M. The use of this image sensing device can form a variety of constructions essentially equal in the working principle to this embodiment.

Next, a further embodiment of the present invention will be described. The overall configuration of this embodiment is similar to that of FIG. 1, except that the inner structure of the image sensing device 3 is different. The configuration of the image sensing device in this embodiment is shown in FIG. 10. In FIG. 10, denoted 30 are pixels formed of photodiodes, which are arranged horizontally and vertically in a grid pattern. On these grid-arrayed pixels three types of color filters that pass yellow (Ye), green (G) and cyan (Cy), respectively, are arranged in so-called vertical stripes.

In this embodiment, the image sensing device has an array of pixels measuring 864 pixels vertically and 1152 pixels horizontally. A vertical transfer unit 32 is a CCD which is driven by six phase pulses V1, V2, V3, V4, V5, V6. This CCD has a two-gate structure in which each pixel corresponds to two phase pulses and six gates corresponding to the six phase pulses are repeated for every three pixels. Transfer gates 31 for transferring the signal charge of each pixel to the vertical transfer unit 32 are commonly connected to respective gates of the vertical transfer unit 32 corresponding to the pulses V1, V3, V5. An operation to transfer the signal charge from each pixel to the vertical transfer unit 32 in response to peak values of pulses applied to the commonly connected gates and an operation to transfer the charge vertically are performed separately.

A horizontal transfer unit 33 horizontally transfers the charges supplied from the vertical transfer units 32 and outputs them successively through an output amplifier 34 from the output terminal. This image sensing device, unlike the one in the previous embodiment, cannot vertically transfer all pixels independently of each other, but can mix together the signal charges of three vertically adjoining pixels inside the vertical transfer unit 32 before transferring them.

First, the operation performed in this embodiment during the moving video mode will be explained. In the image sensing device of this embodiment the effective number of vertically arranged pixels is 864. If three pixels are vertically mixed, the signals of the 720 (=240×3) of the 864 vertically arranged pixels can be used as the effective signals and the remaining 144 (=864−720) pixels can be used as the image-unstability correction pixel area.

FIG. 11 shows the timings of vertical drive pulses for the image sensing device of FIG. 10 during this operation mode, with V1, V2, V3, V4, V5, V6 representing the six phase drive pulses applied to the respective gates of the CCD or vertical transfer unit 32. In FIG. 11, during a period T1 included in the vertical blanking period, the drive pulses V1, V3 and V5 are held high to cause the signal charge of each pixel to be transferred to under the V1, V3 and V5 gates of the vertical CCD. Then, the V2 and V4 pulses are changed from low level to middle level to mix the charges of the adjoining three pixels. After the mixing, the V5 pulse is changed from middle level to low level to hold the mixed signal charges under the V1, V2, V3, V4 gates.

Next, a series of operations performed during a period T2 (changing the drive pulses from middle level to low level or from low level to middle level in the order of V1, V2, V3, V4, V5 and V6) causes one mixed output line (3 pixel rows) to be transferred and held again under the V1, V2, V3, V4 gate. By repeating this series of operations, a desired number of output lines of mixed signal charges can be transferred.

In FIG. 11, during a period T3 included in the vertical blanking period before the vertical effective scanning period and during a period T4 included in the vertical blanking period after the vertical effective scanning period, the transfer operation for one output line is repeated a total of 144 times to transfer 144 output lines of signal charges not used for image forming to the horizontal transfer unit 33 at high speed during the vertical blanking periods. During subsequent periods T5 and T6 in the vertical blanking periods, the horizontal transfer unit 33 is driven for predetermined periods to output the signal charges transferred to the horizontal transfer unit 33 from the output terminal.

Next, in the vertical effective scanning period of FIG. 11, the one-output-signal-line transfer operation is performed during each horizontal blanking period. Then, during the horizontal effective scanning period, the horizontal transfer unit 33 is driven to read out the signal charges from the horizontal transfer unit 33. With this operation the signal charges of three pixels mixed together can be read out in a way conforming to the television system. As shown in FIG. 11, the signals for the A field are mixed by changing the V2 and V4 pulses to middle level after transferring the signals from the pixels to the vertical transfer unit 32. The signals for the B field, on the other hand, are mixed by changing the V2 and V6 pulses to middle level. With this mixing method, the combinations of pixels to be cyclically mixed together can be changed from one field to another, thereby realizing the interlaced scanning. The output signals from the image sensing device are processed in the similar manner to that of the previous embodiment. A vertical interpolation circuit 8 performs the gravity center correction, as in the 3-pixel mixing in the previous embodiment, and a horizontal interpolation circuit 9 performs interpolation processing to match the aspect ratio with that of the television system.

Next, the operation during the monitoring in the static image mode will be explained. It is assumed that the still image photographing is done by using all effective pixels of the image sensing device, as in the previous embodiment. The image sensing device of this embodiment has 864 vertically arranged pixels and, when 3-pixel mixing is done as in the moving video taking, the number of output lines is 288 (=864/3), which means that these signal lines cannot be read out in a manner conforming to the television system. Hence, during the monitoring in the static image mode, vertical 6-pixel mixing is performed. The 6-pixel mixing can be achieved by transferring to the horizontal transfer unit 33 in each horizontal blanking period two output lines of signal charges each of which line has been generated by vertically mixing three pixels within the vertical transfer unit 32. The 6-pixel mixing can reduce the number of output lines from the image sensing device down to 144 (=864/6) lines. The output signals of the image sensing device that were reduced to 144 output lines are interpolated by the vertical interpolation circuit 8 to transform the 144 output lines of signals into 240 lines of signals, which conform to the television system. To generate 240 lines of signals from the 144 lines requires interpolation processing that generates five lines from three lines ($144/240=3/5$).

FIG. 12 shows how the interpolation is performed using two adjoining output lines. Let three output lines of the image sensing device be n, n+1 and n+2. The five output lines of signals can be generated from the following calculations.

$$n'=n$$

$$n'+1=n/2+(n+1)/2$$

$$n'+2=n+1$$

$$n'+3=(n+1)/2+(n+2)/2$$

$$n'+4=n+2$$

Three or more output lines of signals may be used for interpolation processing. With the above operation, television signals can be generated by using signals of all pixels of the image sensing device also during the monitoring in the static image mode.

Next, the operation performed when the recording is requested by the record button 15 will be explained. In the recording process, the mixing processing is not performed and signals of all pixels need to be read independently of each other in order to obtain high-resolution signals. To realize this, the aperture 2 is first closed and then, during the period T2 in the pulse timing diagram of FIG. 11, only the V1 pulse is raised to high level to transfer the signal charge of only the pixel adjacent to the V1 gate to the vertical transfer unit 32. Then, the vertical transfer unit 32 and the horizontal transfer unit 33 are successively driven to read out the signal charges. Similarly, the V3 pulse is raised to high level to read the signal charge of the pixel adjacent to the V3 gate, followed by raising the V5 pulse to high level to read the signal charge of the pixel adjacent to the V5 gate. With the above processing, the signal charges of all pixels can be read out independently in three successive operations. The signal charges thus read out are recorded in the recording unit 10. At this time, they are rearranged properly to reconstruct the pixel arrangement on the light receiving surface of the image sensing device.

As described above, this embodiment offers the following advantages. If the number of vertically arranged pixels is not an integral multiple of the number of scanning lines of the television system, the signals conforming to the television system can be generated from the whole area of effective pixels by performing the pixel mixing and the vertical interpolation.

In this embodiment, as in the previous embodiment, regardless of the number of pixels in the image sensing device, the structure of the image sensing device or the television system employed, a variety of constructions essentially equal in the working principle to this embodiment can be realized by using an image sensing device that has an arbitrary number of vertically arranged pixels N three or more times the number of effective scanning lines M of each field and which allows the vertical mixing or culling of that number of pixels which is greater by at least one than the integral part of a quotient of N divided by M.

Next, a further embodiment of the present invention will be explained. This embodiment differs from the previous embodiments in that the image sensing device have different arrangements of color filters. FIGS. 13A and 13B show arrangements of color filters in this embodiment. These color filters in both examples are arranged in vertical stripes and, regardless of the number of pixels to be vertically mixed or culled, the R, G, B primary color signals can be generated from one line of output signals. FIG. 13A shows a color filter arrangement on the image sensing device in which white filters (W=passing all colors) are used instead of the green (G) filters used in the previous embodiment. The R, G, B signals can be obtained by the following calculations.

$$R=W-Cy$$

$$G=Ye+Cy-W$$

$$B=W-Ye$$

When this color filter arrangement is used, a higher sensitivity can be obtained than the color filter arrangement of the previous embodiment. FIG. 13B show a color filter arrangement that uses, in stead of complementary colors, color filters that pass the primary colors R, G, B. This color filter arrangement can directly produce the primary color signals, R, G, B and can provide a camera with good color purity and good color S/N.

With the above color filter arrangements, it is possible to produce color signals corresponding to the three kinds of color filters from each line of output signals at all times no matter how many pixels are vertically mixed or culled. Therefore, color signals conforming to the television system can be generated easily.

The invention claimed is:

1. A camera comprising:
   an image sensor having an array of pixels arranged vertically and horizontally in a grid pattern;
   a processor to form a plurality of image signals by using the pixels of the image sensor in a static image mode and a moving video mode, the processor configured to:
      form the image signals by using a first set of the pixels of the image sensor corresponding to a predetermined first view angle during recording in the static image mode, and
      form the image signals by using a second set of the pixels of the image sensor corresponding to a predetermined second view angle during recording in the moving video mode, wherein the predetermined second view angle is different from the predetermined first view angle;
   an image-instability detector configured to detect an amount of image-instability of the camera and configured to change a position of the second set of the pixels according to the amount of image-instability detected by the image-instability detector, in order to correct the image-instability; and
   a display configured to:
      display a still image corresponding to the image signals formed based on the first set of the pixels, and
      display a moving image corresponding to the image signals formed based on the second set of the pixels.

2. The camera according to claim 1, wherein the position of the second set of the pixels is changed to perform instability correction caused by vertical movement of the camera.

3. The camera according to claim 1, wherein the position of the second set of the pixels is changed to perform instability correction caused by horizontal movement of the camera.

4. The camera according to claim 1,
wherein the position of the second set of the pixels is changed to perform instability correction caused by vertical and horizontal movement of the camera.

5. The camera according to claim 1,
wherein the processor is further configured to perform white balance processing on one or more of the first or second set of the pixels.

6. The camera according to claim 1,
wherein the processor is further configured to perform luminance signal processing on one or more of the first or second set of the pixels.

7. The camera according to claim 1,
wherein the processor is further configured to perform color signal processing on one or more of the first or second set of the pixels.

8. The camera according to claim 1, further comprising:
an interpolator configured to perform interpolation operations on one or more of the first or second set of the pixels.

9. The camera according to claim 1, further comprising:
an encoder configured to encode the still image with a first encoding format and for encoding the moving image with a second encoding format, wherein the first encoding format is different from the second encoding format.

10. The camera according to claim 1, further comprising:
a memory configured to record the still image after the still image is encoded by a first encoding method and for recording the moving image after the moving image is encoded by a second encoding method that is different from the first encoding method.

11. An operating method for a camera comprising:
receiving light with an image sensor having an array of pixels arranged vertically and horizontally in a grid pattern;
forming a plurality of image signals by using the pixels of the image sensor in a static image mode and a moving video mode, including:
forming the image signals by using a first set of the pixels of the image sensor corresponding to a predetermined first view angle during recording in the static image mode; and
forming the image signals by using a second set of the pixels of the image sensor corresponding to a predetermined second view angle during recording in the moving video mode, wherein the predetermined second view angle is different from the predetermined first view angle;
detecting an amount of image-instability of the camera and changing a position of the second set of the pixels according to the amount of detected image-instability, in order to correct the image-instability;
displaying a still image corresponding to the image signals formed based on the first set of the pixels; and
displaying a moving image corresponding to the image signals formed based on the second set of the pixels.

12. The method according to claim 11,
wherein the position of the second set of the pixels is changed to perform instability correction caused by vertical movement of the camera.

13. The method according to claim 11,
wherein the position of the second set of the pixels is changed to perform instability correction caused by horizontal movement of the camera.

14. The method according to claim 11,
wherein the position of the second set of the pixels is changed to perform instability correction caused by vertical and horizontal movement of the camera.

15. The method according to claim 11, further comprising:
performing white balance processing on one or more of the first or second set of of the pixels.

16. The method according to claim 11, further comprising:
performing luminance signal processing on one or more of the first or second set of the pixels.

17. The method according to claim 11, further comprising:
performing color signal processing on one or more of the first or second set of the pixels.

18. The method according to claim 11, further comprising:
performing interpolation operations on one or more of the first or second set of the pixels.

19. The method according to claim 11, further comprising:
encoding the still image with a first encoding format and encoding the moving image with a second encoding format, wherein the first encoding format is different from the second encoding format.

20. The method according to claim 11, further comprising:
recording the still image after the still image is encoded by a first encoding step and recording the moving image after the moving image is encoded by a second encoding step that is different from the first encoding step.

* * * * *